Patented July 10, 1934

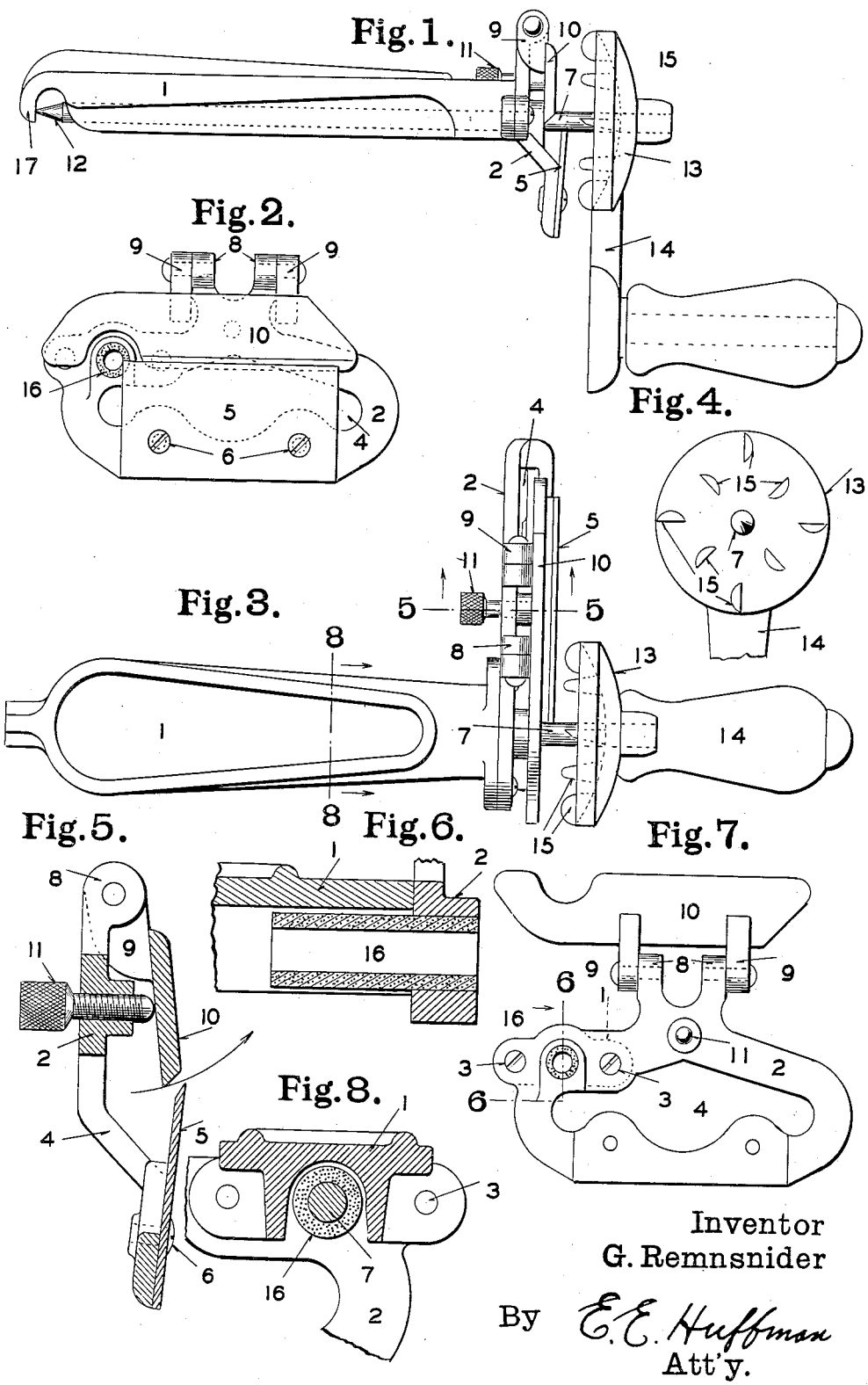

1,966,186

UNITED STATES PATENT OFFICE 1,966,186

VEGETABLE SLICER

George Remnsnider, Belleville, Ill.

Application August 6, 1931, Serial No. 555,409

3 Claims. (Cl. 146—166)

My invention relates to a vegetable slicer and particularly to that type of slicer adapted for domestic use which is operated manually and also preferably held in the hand of the operator during use.

In the accompanying drawing, which illustrates one form of vegetable slicer made in accordance with my invention, Figure 1 is a side elevation; Figure 2 is a front view of the slicing member; Figure 3 is a top plan view; Figure 4 is a rear view of the vegetable holding member; Figure 5 is an enlarged section taken on the line 5—5 of Figure 3; Figure 6 is an enlarged section taken on the line 6—6 of Figure 7; Figure 7 is a view similar to Figure 2 but showing the guide raised and the knife removed; and Figure 8 is an enlarged section taken on the line 8—8 of Figure 3.

The device consists of two separable elements, a slicing member and a vegetable holding member, the former adapted to be held in the left hand of the operator while the latter is rotated by the right hand. The slicing element comprises a handle 1 and a blade carrying plate 2. For convenience of manufacture the handle and plate are made separate and secured together by screws 3, as shown. The lower part of the plate is positioned forward of the plane of the upper part and is provided with an opening 4, best shown in Figure 7, for the discharge of the sliced vegetable. A knife 5 is secured to the lower part of the plate by screws 6 and is inclined at a slight angle to a plane perpendicular to the axis of the vegetable impaling rod 7. Projecting upwardly from the plate are a pair of lugs 8 pivoted to lugs 9 on a guide 10 which, by its position relative to the knife, determines the thickness of the slice. The position of the guide is determined by a setscrew 11 threaded in the plate and bearing against the rear face of the guide.

The impaling rod 7, which is provided with a sharpened end 12, is rigidly secured in a concave disc 13. This disc, together with the rod 7 and an operating arm 14, forms the vegetable holding member. The disc 13 is provided with spurs 15 for engaging with the vegetable to insure its rotating with the holding member. The rod 7 extends through the handle and rotates in a bushing 16. The corner of the knife must be positioned so as to almost contact with the periphery of the rod when it is in position in order to insure the slicing of the vegetable to the center. Consequently, the rod should fit the bushing without appreciable side play. I have found that when a metallic bushing is used, minute particles of metal are detached from the rod and bushing with resultant discoloration of the vegetable where the rod is thrust through it. To avoid this I form the bushing of non-metallic material. I have found the most satisfactory material for this purpose to be the phenol condensation product commercially known as "Bakelite." To limit the inward movement of the disc and thus prevent the contact of the spurs 15 with the knife 5, I provide the end of the handle 1 with a lip contacting with the pointed end of the rod.

In the operation of my device the rod 7 is thrust through the vegetable to be sliced, the vegetable having its convex surface forced into the concave of the disc 13 to firmly engage it with the spurs. The rod is then inserted in the bushing and moved inwardly until the end of the vegetable contacts with the knife 5. The vegetable holding member is now rotated by means of the handle 14 until the entire vegetable, with the exception of the small portion engaged by the spurs, is sliced into a continuous spiral of uniform thickness, which thickness may be determined to suit the requirements of the user by adjusting the guide 10. In case individual pieces are desired, as for example, in forming potato chips, a knife is drawn longitudinally along one side of the vegetable before slicing, the cut of course extending in to the rod 7.

While the guide 10 should extend down substantially to the knife 5, it is so arranged as to swing past the knife, as shown by the arrow in Figure 5, in order to allow the guide to be swung upward, as shown in Figure 7, to give access to all the parts for ready cleaning.

Having fully described my invention, what I claim as new and desire to secure by Letters Patent of the United States is:

1. In a device of the class described, the combination with a handle, of a plate carried thereby and extending in a plane at right angles thereto, said plate having a forwardly extending portion with an opening therein for the passage of the sliced vegetable, a knife rigidly carried by said plate, a guide pivotally carried by said plate, means for moving the guide toward and away from the knife, said plate being provided with a bearing, a vegetable piercing rod slidable in said bearing and projecting into the handle to present the vegetable thereon to the knife, a stop for the rod, and means for rotating said rod to slice the vegetable thereon.

2. In a device of the class described, the combination with a member carrying a slicing knife, said member being provided with a bearing, a vegetable piercing rod slidable in said bearing, a head on said rod provided with spurs for engaging and rotating the vegetable, a handle forming a housing for the rod and bearing, a stop carried by said handle for engaging with the end of the rod to limit the movement of said head toward said knife, and a guide positioned at the side of the knife opposite the head and movable toward and away from the knife to regulate the thickness of the slice produced, whereby variations in the thickness of the slice may be made without varying the minimum clearance between the head and the knife.

3. In a device of the class described, the combination of a vegetable piercing rod, a head on one end of said rod provided with vegetable engaging spurs and with an operating crank arm, a handle having a longitudinal passage for said rod, a slicing knife carried on the end of the handle adjacent the head, means for limiting the movement of the head toward the knife to provide a minimum clearance between said parts, a guide positioned at the side of the knife opposite the head and pivoted at its outer edge, and means for moving the guide on its pivot to vary the width of the slice, whereby variation in the thickness of the slice may be made without varying the minimum clearance between the head and the knife, said guide being of such width as to swing outwardly past the knife to permit cleaning of the parts.

GEO. REMNSNIDER.